US 8,310,586 B2

(12) United States Patent
Sugimoto

(10) Patent No.: US 8,310,586 B2
(45) Date of Patent: Nov. 13, 2012

(54) PHOTOGRAPHING APPARATUS AND IN-FOCUS POSITION SEARCHING METHOD

(75) Inventor: Masahiko Sugimoto, Asaka (JP)

(73) Assignee: FUJIFILM Corporation, Tokyo (JP)

(*) Notice: Subject to any disclaimer, the term of this patent is extended or adjusted under 35 U.S.C. 154(b) by 333 days.

(21) Appl. No.: 11/830,501

(22) Filed: Jul. 30, 2007

(65) Prior Publication Data

US 2008/0043135 A1 Feb. 21, 2008

(30) Foreign Application Priority Data

Aug. 15, 2006 (JP) ................................. 2006-221630

(51) Int. Cl.
*G03B 13/00* (2006.01)
*G02B 7/09* (2006.01)
(52) U.S. Cl. .................... 348/349; 348/345; 348/353
(58) Field of Classification Search .......... 348/345–357, 348/370; 248/345–356
See application file for complete search history.

(56) References Cited

U.S. PATENT DOCUMENTS

| 4,933,700 | A | | 6/1990 | Ikeda et al. |
| 4,935,763 | A | * | 6/1990 | Itoh et al. ................... 396/81 |
| 5,083,150 | A | * | 1/1992 | Nagasaki et al. ............ 396/49 |
| 5,526,088 | A | | 6/1996 | Kusaka |
| 5,715,483 | A | * | 2/1998 | Omata et al. ................ 396/80 |
| 6,067,115 | A | * | 5/2000 | Suda ........................... 348/350 |
| 6,118,484 | A | * | 9/2000 | Yokota et al. ............... 348/350 |
| 6,441,855 | B1 | * | 8/2002 | Omata et al. ............... 348/356 |
| 6,847,402 | B2 | * | 1/2005 | Sugimoto et al. ........... 348/354 |
| 7,362,368 | B2 | * | 4/2008 | Steinberg et al. ........... 348/349 |
| 7,450,171 | B2 | * | 11/2008 | Ide et al. ..................... 348/345 |
| 2001/0010556 | A1 | | 8/2001 | Sugimoto et al. |
| 2003/0071908 | A1 | * | 4/2003 | Sannoh et al. .............. 348/345 |
| 2004/0091153 | A1 | * | 5/2004 | Nakano et al. ............. 382/228 |
| 2004/0120399 | A1 | * | 6/2004 | Kato ........................ 375/240.11 |

(Continued)

FOREIGN PATENT DOCUMENTS

CN 1523437 A 8/2004

(Continued)

OTHER PUBLICATIONS

Notification of First Office Action issued by the State Intellectual Property Office of P.R.C. in corresponding application No. 2007101425418, issued Aug. 29, 2008, 17 pages in English and Chinese.

(Continued)

*Primary Examiner* — Sinh Tran
*Assistant Examiner* — Mark Monk
(74) *Attorney, Agent, or Firm* — Sughrue Mion, PLLC

(57) ABSTRACT

The present invention provides a photographing apparatus, in which an object image is formed on an image pickup element through a photographing lens, and a desired frequency component is extracted from an image signal obtained by the image pickup element through a filter so that the extracted frequency component is integrated to calculate a focus evaluation value and, based on the calculated focus evaluation value, an in-focus position of the photographing lens is searched, the apparatus comprising: a scene discrimination section which discriminates a photographing scene of an object image; and a control section which changes either of a searching range of the in-focus position of the photographing lens or the frequency component to be extracted by the filter based on the photographing scene discriminated by the scene discrimination section, and thereafter moves the photographing lens to search an in-focus position.

8 Claims, 16 Drawing Sheets

U.S. PATENT DOCUMENTS

| | | | |
|---|---|---|---|
| 2005/0012832 A1* | 1/2005 | Yano | 348/234 |
| 2005/0088536 A1* | 4/2005 | Ikeda | 348/222.1 |
| 2005/0212950 A1* | 9/2005 | Kanai | 348/345 |
| 2006/0061678 A1* | 3/2006 | Yamazaki | 348/349 |
| 2006/0182433 A1* | 8/2006 | Kawahara et al. | 396/123 |
| 2006/0192898 A1* | 8/2006 | Mino | 348/672 |

FOREIGN PATENT DOCUMENTS

| | | |
|---|---|---|
| JP | 02074911 A | 3/1990 |
| JP | 5-264887 A | 10/1993 |
| JP | 07-162731 | 6/1995 |
| JP | 11-223759 A | 8/1999 |
| JP | 2000258633 A | 9/2000 |
| JP | 2004-205792 A | 7/2004 |
| JP | 2006047439 A | 2/2006 |
| JP | 2006-145666 A | 6/2006 |
| JP | 2006145964 A | 6/2006 |

OTHER PUBLICATIONS

Japanese Office Action issued in JP 2006-221630 dated Jun. 2, 2011.
Japanese Office Action in related case JP 2011-0155039 dated Aug. 24, 2012, 4 pages in Japanese and English.

* cited by examiner

FIG.5

FACE DETECTION LSI OUTPUT INFORMATION

| FACE INFORMATION | REMARKS |
|---|---|
| NUMBER OF DETECTED FACES | FACE DETECTION LSI ITSELF CAN OUTPUT UP TO 10 |
| POSITION OF EACH FACE | CENTER COORDINATES OF EACH FACE (VALUES CONVERTED ON TO 512X384 PLANE) |
| SIZE OF EACH FACE | ONE-HALF OF THE SIDE OF RECTANGLE (VALUE CONVERTED ON TO 512X384 PLANE) : DISTANCE BETWEEN THE CENTER AND THE SIDE |
| DETECTION SCORE FOR EACH FACE | FACE DETECTION LSI JUDGES THAT LIKELIHOOD OF BEING A FACE INCREASES AS THIS NUMBER INCREASES |
| ORIENTATION OF EACH FACE | DISCRIMINATE FRONT FACE, RIGHT-SIDE, LEFT-SIDE ORIENTATIONS |
| TILT OF EACH FACE | DETERMINE ROTATION ANGLE BETWEEN UPRIGHT AND TILT POSITIONS BY A STEP OF 30 DEGREES |

PHOTOGRAPHING OPERATION GENERAL FLOW

FACE DETECTION S1 AF GENERAL FLOW

AF-TARGET REGION SETTING FLOW

FIG.11

| FACE_AF_BACKLIGHT_FLAG | AF OPERATION SPECIALIZED FOR BACKLIGHT FACE |
|---|---|
| 0 | OFF |
| 1 | ON |

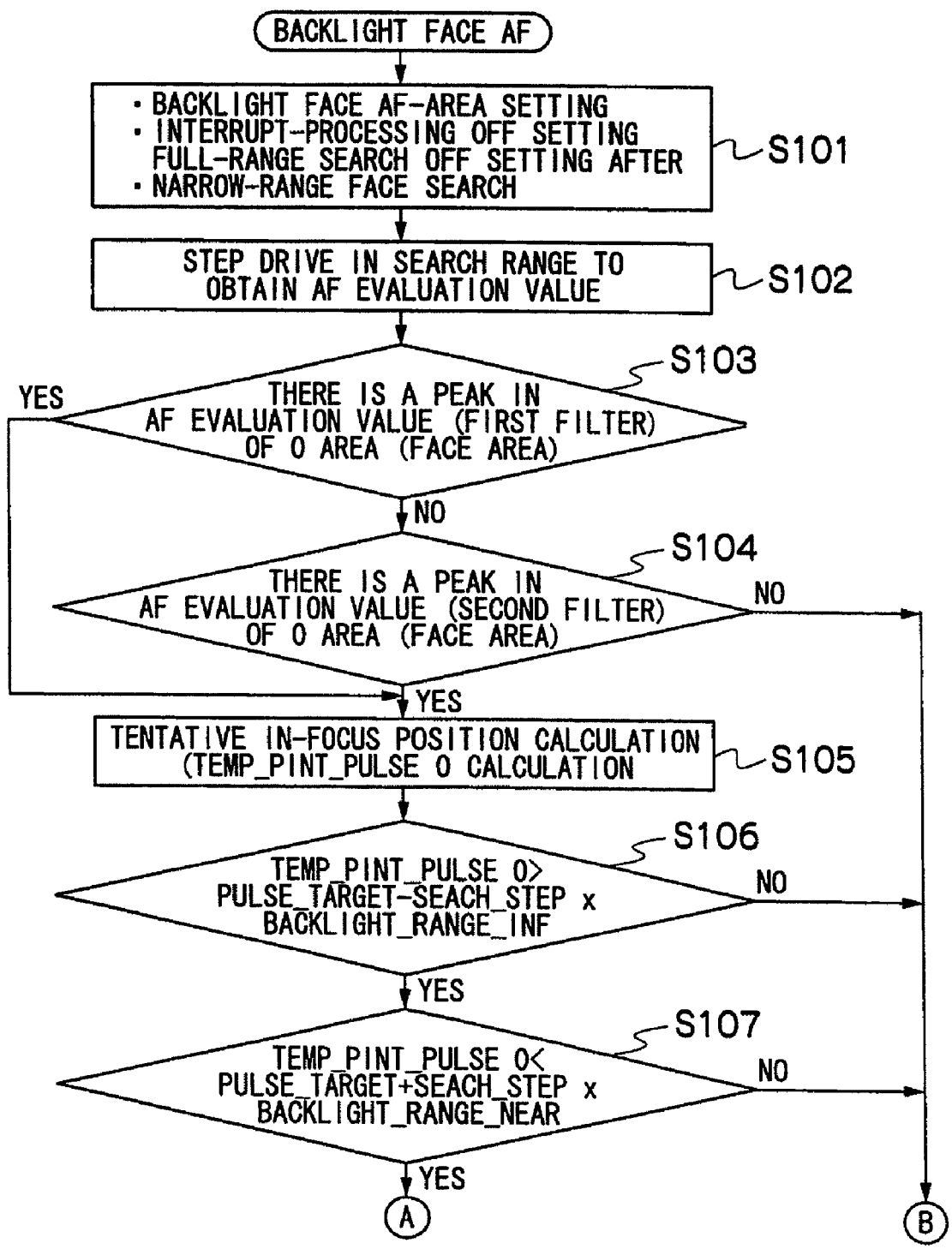

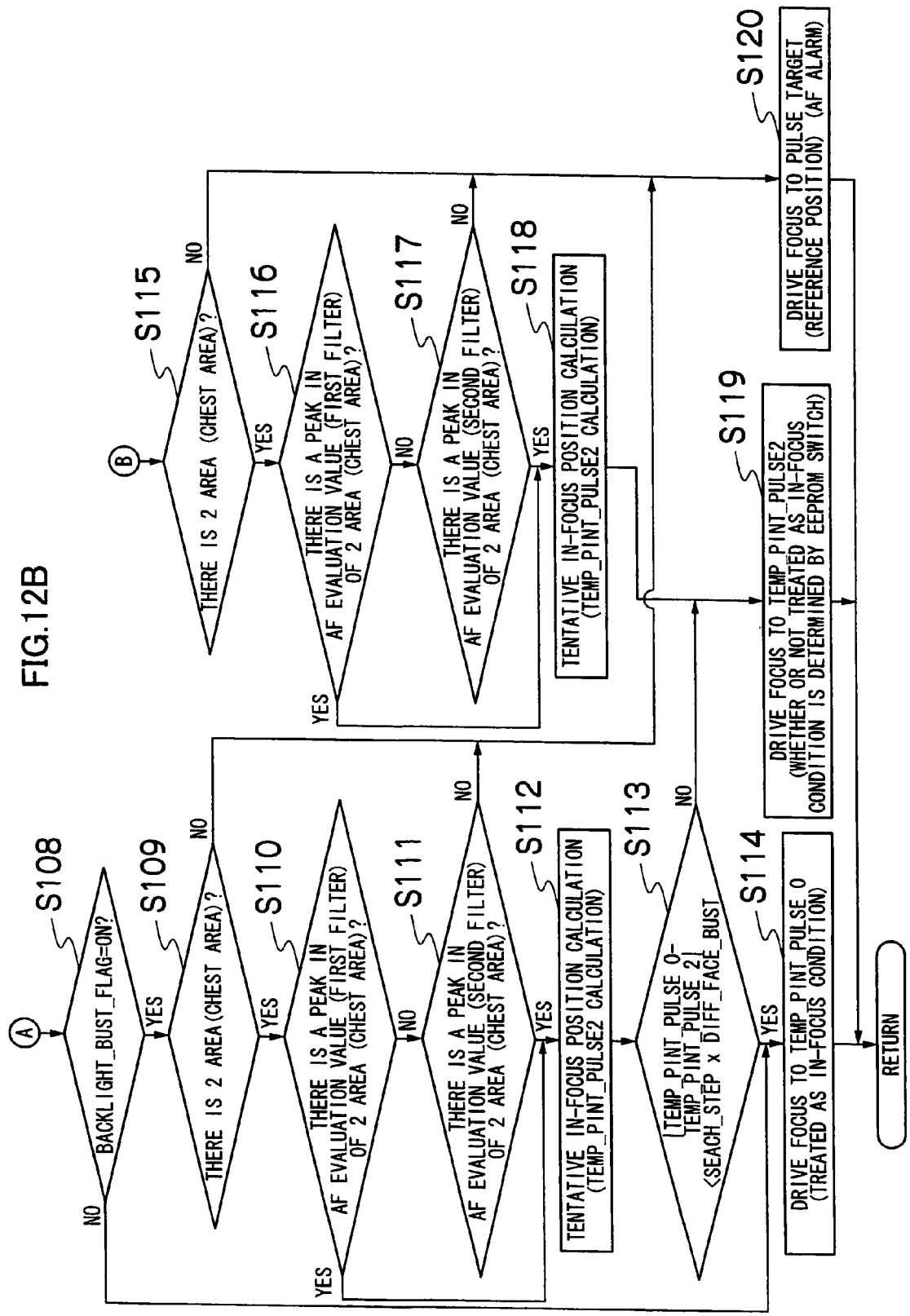

OPERATION IMAGE OF AF AREA ENLARGEMENT PATTERN a
(ex.Ny=5,v_area_step=2)

OPERATION IMAGE OF AF AREA ENLARGEMENT PATTERN b
(ex.Nx=6,h_area_step=3)

OPERATION IMAGE OF AF AREA ENLARGEMENT PATTERN c
(ex.Ny=5,v_area_step=2)

OPERATION IMAGE OF AF AREA ENLARGEMENT PATTERN d
(ex.Nx=6,h_area_step=3)

PHOTOGRAPHING APPARATUS AND IN-FOCUS POSITION SEARCHING METHOD

BACKGROUND OF THE INVENTION

1. Field of the Invention

The present invention relates to a photographing apparatus which has a face detection AF (auto focus) function.

2. Description of the Related Art

Conventionally, there have been photographing apparatuses which discriminate a backlight condition. For example, in the apparatus according to Japanese Patent Application Laid-Open No. 05-264887, it is judged whether or not an object is in a backlight condition and, when judged to be in a backlight condition, the integration time of a charge-storage image sensor is increased to perform integration once again so that focus detection is carried out again based on the sensor output at that moment.

According to Japanese Patent Application Laid-Open No. 11-223759, the apparatus comprises two types of sampling devices (having at least part of storage time in common) and is configured such that when judged to be in a backlight condition, focus detection is carried out giving precedence to the output of the second sampling device.

In the apparatus according to Japanese Patent Application Laid-Open No. 2006-145666, an in-focus evaluation value is obtained by detecting the signal amount of a high frequency component of the image signal and, based on the in-focus evaluation value, an in-focus position is detected and a judgment is made on whether the detected in-focus position is the in-focus position or a false in-focus position.

SUMMARY OF THE INVENTION

According to the technique of Japanese Patent Application Laid-Open No. 05-264887, in the case of a backlight condition, two times of integration and two times of computation in total are performed, which makes the focus detection time consuming. According to the technique of Japanese Patent Application Laid-Open No. 11-223759, to vary the charge-storage time for AF depending on the result of backlight judgment, it is necessary to switch the operation of the image pickup element. In Japanese Patent Application Laid-Open No. 2006-145666, focusing suitable for the photographing scene will not necessarily always be achieved.

The present invention has been made in view of the above described problems, and its object is to enhance the success rate of focusing by performing an AF control suitable for the scene.

The present invention relates to a photographing apparatus or an in-focus position searching method, in which an object image is formed on an image pickup element through a photographing lens, and a desired frequency component is extracted from an image signal obtained by the image pickup element through a filter so that the extracted frequency component is integrated to calculate a focus evaluation value and, based on the calculated focus evaluation value, an in-focus position of the photographing lens is searched.

The photographing apparatus relating to one aspect of the present invention comprises: a scene discrimination section which discriminates a photographing scene of an object image; and a control section which changes either of the searching range of an in-focus position of the photographing lens or the frequency component to be extracted by the filter based on the photographing scene discriminated by the scene discrimination section, and thereafter moves the photographing lens to search an in-focus position.

According to this aspect of the invention, it is possible to perform an accurate search for in-focus position depending on photographing scenes such as the presence or absence of a backlight or a face since the in-focus position is calculated by changing at least either one of the in-focus position searching range or the filter for in-focus detection depending on the photographing scenes.

The photographing scene as used herein includes: being in a backlight or normal light condition, photographing a human object or an object other than humans, having a bright or dark image, and having a high or low contrast image.

Further, the photographing apparatus relating to another aspect of the present invention comprises a scene discrimination section which discriminates a photographing scene, and a control section which performs an in-focus position searching procedure depending on the photographing scene discriminated by the scene discriminating section.

According to this aspect of the invention, it is possible to perform an accurate focusing depending on photographing scenes by performing an appropriate in-focus position calculation procedure depending on the photographing scene.

Furthermore, the photographing apparatus relating to another aspect of the present invention comprises: a tentative in-focus position calculation section which calculates a first tentative in-focus position and a second tentative in-focus position respectively through a first procedure for calculating a focus evaluation value based on a signal output from a filter and a second procedure which is different from the first procedure; and a control section which judges whether or not the difference between the first tentative in-focus position and the second tentative in-focus position is within a predetermined range and, in response to the judgment that the difference is within the predetermined range, moves the photographing lens to the first tentative in-focus position as a final in-focus position.

According to this aspect of the invention, since tentative in-focus positions are calculated by two different procedures and, when the difference between them is within a predetermined range, the first tentative in-focus position is determined to be the final in-focus position; it is possible to assure a high probability that the first in-focus position is the true in-focus position, thereby performing an accurate focusing.

The apparatus may be configured such that the tentative in-focus position calculation section changes at least either one of a focus-evaluation-value calculation target region of the first tentative in-focus position and the frequency component to be extracted by the filter in response to a judgment that the difference is not within the predetermined range, and thereafter calculates the first tentative in-focus position again, and the control section judges whether or not the difference between the redetected first tentative in-focus position and the second tentative in-focus position is within a predetermined range and, in response to a judgment that the difference is within the predetermined range, moves the photographing lens to the first in-focus position as a final in-focus position.

The control section may repeat the recalculation of the first tentative in-focus position until a judgment is made that the difference is within the predetermined range.

The control section, in response to an event that the number of the calculation of the first tentative in-focus position becomes more than a predetermined number which is one or more, may move the photographing lens to the reference position as a final in-focus position.

The apparatus may further comprise a scene discrimination section which discriminates a photographing scene, and may be configured such that the control section changes at least one of the predetermined range and the predetermined reference position based on the photographing scene discriminated by the scene discrimination section.

The configuration may also be such that the scene discrimination section detects a backlight condition, and the control section compares two tentative in-focus positions calculated for two different focus-evaluation-value calculation target region in response to a detection of a backlight condition by the scene discrimination section and, when the difference between the two tentative in-focus positions is within a predetermined range, lets the two tentative in-focus positions detected for either one of the two focus-evaluation-value calculation target regions be the final in-focus position.

The apparatus may further comprise a face detection section which detects a face region based on an image signal, and a region determination section which determines at least any one of a neck region, a chest region, an abdomen region, and a leg region depending on the face region detected by the face detection section.

In this case, the two different focus-evaluation-value calculation target regions may include any two of a face region, a neck region, a chest region, an abdomen region, a leg region and any region combining all or part thereof.

Moreover, the focus-evaluation-value calculation target region may include any one of a face region, a neck region, a chest region, an abdomen region, a leg region and any region combining all or part thereof.

It may be configured such that the frequency component to be extracted by the filter may be switched from a predetermined first frequency component to a predetermined second frequency component which is lower than the first frequency component.

The in-focus position searching method relating to one aspect of the present invention comprises the steps of: discriminating a photographing scene of an object image; and changing at least either one of the searching range of the in-focus position of the photographing lens and the frequency component to be extracted by the filter, and thereafter moving the photographing lens so as to search the in-focus position.

The in-focus position searching method relating to one aspect of the present invention comprises steps of: discriminating a photographing scene, and performing an in-focus position searching procedure depending on the discriminated photographing scene.

The in-focus position searching method relating to another aspect of the present invention comprises steps of: calculating a first tentative in-focus position and a second tentative in-focus position respectively through a first procedure for calculating a focus evaluation value based on a signal output from a filter and a second procedure which is different from the first procedure; and judging whether or not the difference between the first tentative in-focus position and the second tentative in-focus position is within a predetermined range and, in response to a judgment that the difference is within the predetermined range, moving the photographing lens to the first tentative in-focus position as a final in-focus position.

According to the present invention, since in-focus position is calculated by changing at least either one of the in-focus position detection range and the filter for in-focus detection depending on photographing scenes, it is possible to perform an accurate focusing depending on photographing scenes including the presence and absence of a backlight or a face, and the like.

BRIEF DESCRIPTION OF THE DRAWINGS

FIG. 5 shows an example of a face information output by the face detection LSI;
FIG. 11 shows an example of a flag showing the result of a backlight judgment;
FIGS. 12A and 12B show flow charts of a backlight face AF processing relating to a first embodiment of the present invention.

DETAILED DESCRIPTION OF THE PREFERRED EMBODIMENTS

Now, preferred embodiment of the present invention will be explained below with reference the drawings.

First Embodiment

Figure 1:
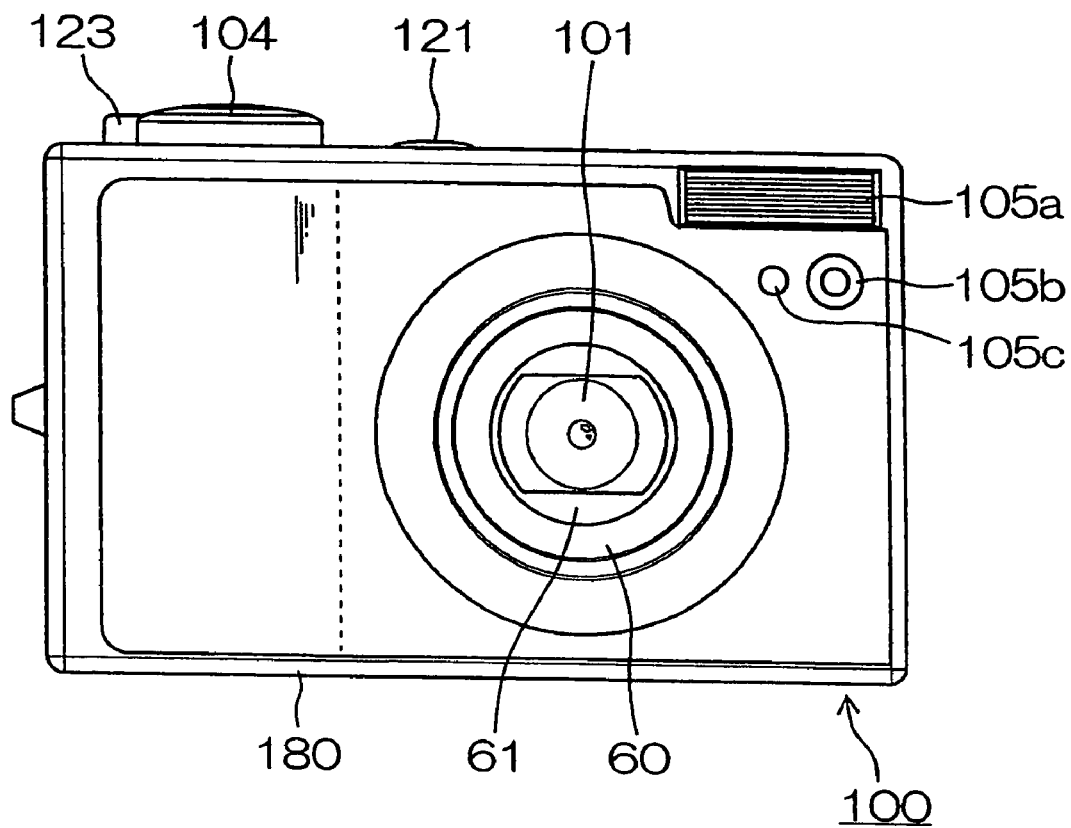
FIG. 1 shows a front view of a digital camera.

FIG. 1 is a front view showing a digital camera (hereinafter, simply referred to as camera) 100 according to a preferred embodiment of the present invention.

The camera 100 has a lens barrel 60 on the front surface thereof, and the lens barrel 60 is provided with a built-in photographing lens 101 including a zoom lens 101*a* and a focusing lens 101*b*, so that a movement of the zoom lens 101*a* in the direction of the optical axis enables a focal length adjustment, and also a movement of the focusing lens 101*b* in the direction of the optical axis enables a focus adjustment.

The lens barrel 60 advances and retracts between a wide angle end for the shortest focal length and a telephoto end for the longest focal length, both ends being set in advance, so as to be projected out of and housed in a camera body 180. In FIG. 1, the lens barrel 60 is retracted in the camera body 180.

The camera 100 is also provided with a lens cover 61 for protecting the photographing lens 101 by covering the front surface of the photographing lens 101 to shield it from the outside while the camera 100 is not operated for photographing, and for exposing the photographing lens 101 to the outside for image pickup.

The lens cover 61 is configured with an openable and closable mechanism for covering the front surface of the photographing lens 101 at its open position, and exposing the front surface of the photographing lens 101 to the outside at its closed position. The lens cover 61 is interlocked to a power button 121 to be opened/closed. In FIG. 1, the lens cover 61 is opened.

The camera 100 has a mode dial 123 provided with a central release button 104, and a power button 121 on the top surface thereof, and has an electronic flash unit 105*a*, an AF auxiliary light lamp 105*b*, a Self-timer lamp 105*c* and the like on the front surface thereof.

Figure 2:
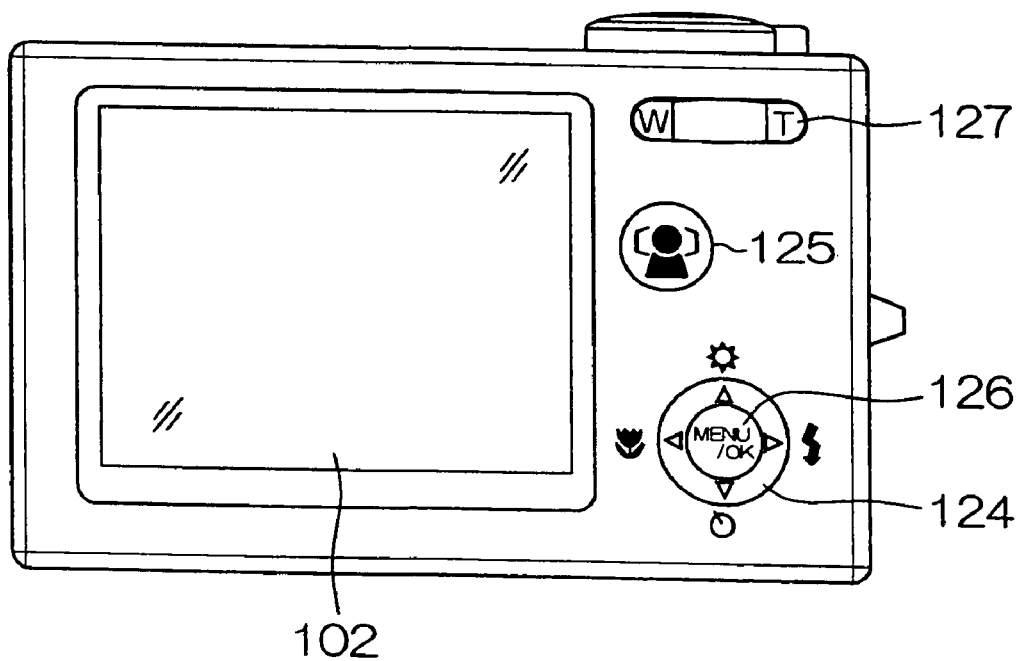
FIG. 2 shows a rear view of a digital camera.

FIG. 2 is a back view showing the camera 100. The camera 100 has a zoom switch 127 on the rear surface thereof. A continuous pressing of a telephoto (T) side of the zoom switch 127 causes the lens barrel 60 to be projected toward the telephoto side, and a continuous pressing of the other side (W) of the zoom switch 127 causes the lens barrel 60 to move toward the wide angle side.

There are provided in the back of the camera 100 an image display LCD 102, a cross key 124, a face button 125, an information position specifying key 126, etc. The cross key 124 is a control system of which up/down and left/right directions respectively set display brightness adjustment/a self-timer/macro photographing/stroboscopic photographing. As described below, by pressing down the down key of the cross key 124, it is possible to set a self photographing mode in which the main CPU 20 makes the CCD 132 perform a shutter operation upon completion of the timing of the self timer circuit 83. When the face button 125 is pressed down while a photographing mode is set, the below described face detection is initiated.

Figure 3:
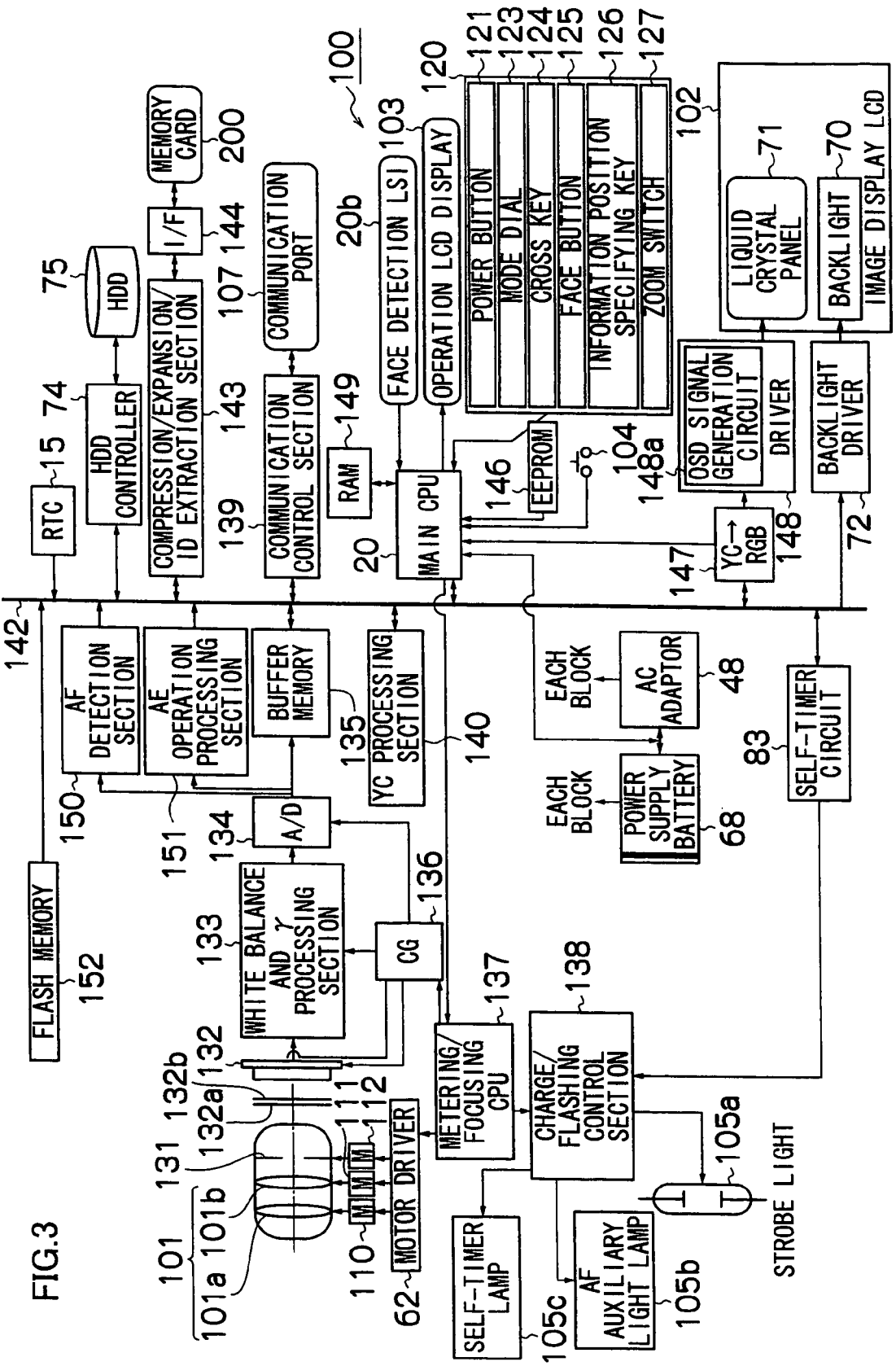
FIG. 3 shows a block diagram of a digital camera.

FIG. 3 shows a block diagram of the camera 100. The camera 100 is provided with a control section 120 by which the user can perform various controls when using this camera 100. The control section 120 includes: a power switch 121 for turning on the power to activate the camera 100; a mode dial 123 for selecting an auto operation, a manual operation, a landscape mode, a portrait mode, a certificate photograph mode, etc.; a cross key 124 for setting and selecting various menus or performing zooming; a face button 125; and an information position specifying key 126 for executing or cancelling the menu selected by the cross key 124.

The camera 100 is also provided with an image display LCD 102 for displaying a photographed image, reproduced image or the like, and an operation LCD display 103 for assisting the operations.

The camera 100 includes a release button 104. A pressing of the release button 104 informs a main CPU 20 of a start of photographing. The camera 100 is switchable between a photographing mode and a reproducing mode by using a predetermined menu screen. The camera 100 is also provided with an AF auxiliary light lamp 105b having light emitting diodes (LED) for emitting a spot light to an object in a contrast AF mode, and a flash operation device having an electronic flash unit 105a for flashing light.

The camera 100 is also provided with a photographing lens 101, an aperture 131, and a CCD image sensor 132 (hereinafter, simply referred to as CCD 132) which is an image pickup element for converting the object image which is formed through the photographing lens 101 and the aperture 131 into an analog image signal. The CCD 132 generates an image signal by accumulating the charges generated by the object light incident on the CCD 132 for a variable charge storage time (exposure time). The CCD 132 sequentially outputs an image signal for each frame at a timing synchronized with the vertical synchronizing signal VD which is output from a CG section 136.

When the used image pickup element is the CCD 132, an optical lowpass filter 132a is provided thereto which removes unnecessary high frequency components in an incident light in order to prevent generation of a color error signal, moire fringe or the like. Also, an infrared cut filter 132b is provided for absorbing or reflecting the infrared rays of the incident light to correct the sensitivity characteristics inherent to the CCD sensor 132 which has a high sensitivity to a longer wavelength range. The optical lowpass filter 132a and infrared cut filter 132b may be arranged in any manner without being limited to any particular aspect.

The camera 100 is also provided with a white balance and γ processing section 133 which includes an amplifier where amplification factor is variable, for adjusting the white balance of the object image represented by the analog image signal from the CCD sensor 132, controlling the slope (γ) of the straight line in the gradient characteristics of the object image, and amplifying the analog image signal.

The camera 100 is also provided with an A/D converting section 134 for A/D converting the analog signal from the white balance and γ processing section 133 into digital R, G, and B image data, and a buffer memory 135 for storing the R, G, and B image data from the A/D converting section 134.

The R, G, and B image data obtained by the A/D converting section 134 is also input to an AF detecting section 150.

The AF detection section 150 can switch to either one of two different high-pass filters which have a high or low pass frequency band (a frequency band which is passed without being discarded) for image data, as an AF filter. The AF detection section 150 calculates the below described AF evaluation value by preferentially using either one of these filters as an AF filter.

As to which filter is to be preferentially used, a default priority order for switching the filters may be stored in advance in an EEPROM 146, or the filters may be switched in response to the result of a backlight judgment processing described below, or may be switched in response to the result of face detection.

For example, in such cases as: when judged to be a normal lighting condition by the CPU 20; when judged to be a bright photographing scene; when judged that a landscape mode is selected by the mode dial 123; when judged that a face is not detected; when judged that even though a face region is detected, the area of the face region is less than a predetermined proportion (for example, less than 1/10) with respect to the area of the entire image (that is, the data amount of landscape is dominant); when judged to be a high contrast photographing scene as in a case in which luminance is determined for each group of multiple areas by a split photometric measurement to be judged that the luminance difference between adjacent areas is less than a predetermined value; and the like, it is better to switch to a filter having a higher pass frequency band since there will be more high frequency component in the entire image data or in the face region.

Alternatively, in such cases as when judged to be a backlight, when a night scene mode is selected, when the area of face region is smaller than a predetermined proportion, or when the photographing scene is a dark scene or a low contrast scene, it is better to switch to a filter having a lower pass frequency band so as to extract the predetermined frequency component as soon as possible since the high frequency component in the face region becomes more than that in the regions other than the face region, or the amount of image data as a whole or the amount of the image data in the face region decreases.

Alternatively, when a face region is not detected as in the case of a landscape view, the filter may be switched to a high-pass filter having the higher pass frequency band.

In the following description, the AF filter which is given a priority may be represented as First_Filter, and the AF filter which is not given a priority may be represented as Second_Filter. Although, for the sake of simplicity, hereinafter the filter having a higher pass frequency band is designated as First_Filter, and the one having a lower pass frequency band is designated as Second_Filter; the pass frequency bands of the filters may be reversed.

The AF detection section 150 uses the all or part (for example G signal alone) of the R, G, B image data corresponding to a desired summing-up area (AF region) out of the image data from the A/D conversion section 134 to extract the predetermined frequency component from image data which are continuous in a one dimensional, horizontal or vertical direction through an AF filter which can switch the pass frequency band, and outputs a value (AF evaluation value) obtained by summing up this frequency component, to the CPU 20.

The AF detection section 150 may concurrently extract different frequency components from an image obtained in one occasion for both the First_Filter and Second_Filter, and output two AF evaluation values corresponding to them at the same time. Although when the First_Filter and Second_Filter are successively switched to calculate the AF evaluation value, the focus lens 101b needs to be moved twice, that is, when the AF filter is switched to First_Filter and when switched to Second_Filter; in the above described way, only one movement is needed.

The CPU 20 moves the focus lens 101b to the lens position at which the AF evaluation value output from the AF detection section 150 becomes maximum, through a focusing motor 111.

The camera 100 is also provided with the CG (clock generator) section 136, a CPU for metering/focusing CPU 137 a charging and flashing control section 138, a communication control section 139, a YC processing section 140, and a power supply battery 68.

The CG section 136 outputs vertical synchronizing signals VD for driving the CCD 132, driving signals including a high speed output pulse P, control signals for controlling the white balance and γ processing section 133 and the A/D converting section 134, and control signals for controlling the communication control section 139. The CG section 136 receives control signals which are input by a metering/focusing CPU 137.

The metering/focusing CPU 137 controls a zoom motor 110, a focus motor 111, and an aperture motor for aperture adjustment 112 to drive the zoom lens 101a, focusing lens 101b, aperture 131 respectively, so that the distance to the object is calculated (focusing), and the CG section 136 and the charging and flashing control section 138 are controlled. The driving of the zoom motor 110, the focus motor 111, and the aperture motor 112 is controlled by a motor driver 62, control command for motor driver 62 is sent from the metering/focusing CPU 137 or the main CPU 20.

The driving source of the zoom lens 101a, the focusing lens 101b, the aperture 131, and the AF auxiliary light lamp 105 is not necessarily limited to various motors such as the zoom motor 110, the focus motor 111, and the aperture motor 112, and may be an actuator for example.

The metering/focusing CPU 137 measures the brightness of the object (calculation of EV value) based on the image data (through image) periodically obtained (every 1/30 seconds to 1/60 seconds) by the CCD 132 when the release button 104 is half pressed (S1 is on).

That is, an AE operation processing section 151 integrates the R, G, and B image signals output from the A/D converting section 134, and provides the resultant integrated value to the metering/focusing CPU 137. The metering/focusing CPU 137 detects an average brightness of the object (object luminance) based on the integrated value input from the AE operation processing section 151, and calculates an exposure value (EV value) which is appropriate to photographing.

Then, the metering/focusing CPU 137 determines an exposure value including an aperture value (F value) of the aperture 131 and an electronic shutter (shutter speed) of the CCD 132 based on the obtained EV value and according to a predetermined program diagram (AE operation).

A full pressing of the release button 104 (S2 is on) causes the metering/focusing CPU 137 to drive the aperture 131 based on the determined aperture value, control the diameter of the aperture 131, and control the charge storage time at the CCD 132 via the CG 136 based on the determined shutter speed.

The AE operation includes aperture priority AE, shutter speed priority AE, program AE, and the like, and either operation is controlled to pickup image with a proper exposure, by measuring an object luminance and photographing with an exposure value, that is, a combination of an aperture value and a shutter speed, which is determined based on the measured value of the object luminance. This achieves an elimination of the troublesome process to determine an exposure.

The AF detection section 150 extracts image data corresponding to the desired AF region selected by the metering/focusing CPU 137 from the A/D conversion section 134. The method of searching and detecting a focus position is performed by exploiting the feature that the high frequency component of the AF region part in the image data becomes to have a maximum amplitude at an in-focus position. The AF detection section 150 calculates the amplitude value by integrating the high frequency component of the extracted image data for a period of one field. The AF detection section 150 successively performs the calculation of amplitude values while the metering/focusing CPU 137 drives and controls the focusing motor 111 to move it in a movable range, that is, from the end point of infinity side (INF point) to the end point of nearest side (Near point) and sends the detected value to the metering/focusing CPU 137 upon detection of a maximum amplitude. However, such as when a landscape mode in which the focus point is considered to be on the infinity side is set as with Japanese Patent Application Laid-Open No. 2001-208959 by the present applicant, the focus lens 101b may be moved from the infinity side to the nearest side as desired to reduce the time needed for focusing.

The metering/focusing CPU 137, after obtaining the detected value, issues a command to the focus motor 111 to cause the focusing lens 101b to move to the focused position corresponding to the detected value. The focus motor 111 causes the focusing lens 101b to move to the focused position, in response to the command issued by the metering/focusing CPU 137 (AF operation).

The metering/focusing CPU 137 is connected to the release button 104 by way of the communication with the main CPU 20, and when a user presses the release button 104 halfway, the detection of a focused position is performed. The metering/focusing CPU 137 is connected to the zoom motor 110, so that when the main CPU 20 acquires a command for a zooming in the TELE direction or WIDE direction by the zoom switch 127 from a user, a driving of the zoom motor 110 allows the zoom lens 101a to move between the WIDE end and the TELE end.

The charging and flashing control section 138 charges a flashing capacitor (not shown) for flashing the electronic flash unit 105a when powered by a power battery 68, and controls the flashing of the electronic flash unit 105a.

The charging and flashing control section 138 controls the power supply to the Self-timer lamp (tally lamp) 105c and the AF auxiliary light lamp 105b so that a desired light amount can be obtained at a desired timing, in response to the start of the charge of the power battery 68 and the receipt of various signals including the half pressed/fully pressed operation signal of the release button 104 and the signals showing the light amount and flashing timing from the main CPU 20 and the metering/focusing CPU 137.

The Self-timer lamp 105*c* may use LEDs and the LEDs may be common to those used in the AF auxiliary light lamp 105*b*.

The main CPU 20 is connected to the self-timer circuit 83. When a self photographing mode is set, the main CPU 20 performs a clocking based on a fully pressed signal of the release button 104. During the clocking, the main CPU 20 causes the Self-timer lamp 105*c* to blink with the blinking speed being increased as the remained time decreases, through the metering/focusing CPU 137. The self-timer circuit 83 inputs a clocking completion signal to the main CPU 20 upon the completion of the clocking. Then the main CPU 20 causes the CCD 132 to perform a shutter operation based on the clocking completion signal.

The communication control section 139 is provided with a communication port 107. The communication control section 139 functions to perform a data communication with the external apparatus by outputting an image signal of the object photographed by the camera 100 to the external apparatus such as a personal computer having a USB terminal and allowing such an external apparatus to input an image signal to the camera 100. The camera 100 has a function which is mimic to the switching function of a standard camera for photographing onto a roll of a film to switch between ISO film speeds 80, 100, 200, 400, 1600, and when a film speed of ISO 400 or more is selected, the amplification factor of an amplifier included in the white balance and γ processing section 133 switches to a high sensitivity mode in which the amplification factor is set to be higher than a predetermined amplification factor. The communication control section 139 disconnects the communication with an external apparatus during the photographing in a high sensitivity mode.

The camera 100 is further provided with a compressing/expanding/ID extracting section 143 and an I/F section 144. The compressing/expanding/ID extracting section 143 reads out an image data stored in the buffer memory 135 through a bus line 142 and compresses the image data, which is stored in the memory card 200 via the I/F section 144. The compressing/expanding/ID extracting section 143 also extracts an identification number (ID) unique to the memory card 200 when it reads out an image data stored in the memory card 200, so that the compressing/expanding/ID extracting section 143 reads out the image data stored in the memory card 200, and expands and stores it in the buffer memory 135.

A Y/C signal stored in the buffer memory 135 is compressed by the compressing/expanding/ID extracting section 143 according to a predetermined format, and then is recorded to a removable medium such as the memory card 200 or built-in high-capacity storage media such as a hard disk (HDD) 75 via the I/F section 144 in a predetermined format (for example, Exif (Exchangeable Image File Format) file). A recording of a data to the hard disk (HDD) 75 or a reading of a data from the hard disk (HDD) 75 is controlled by the hard disk controller 74 in response to a command issued by the main CPU 20.

The camera 100 is also provided with the main CPU 20, an EEPROM 146, a YC/RGB conversion section 147, and a display driver 148. The main CPU 20 provides overall controls of the camera 100. The EEPROM 146 stores individual data and programs unique to the camera 100. The YC/RGB conversion section 147 converts a color video signal YC generated at the YC processing section 140 into a three-color RGB signal, and outputs the converted signal to the image display LCD 102 via the display driver 148.

The camera 100 has an AC adapter 48 and a power battery 68 removably attached thereto for an electric power supply from an AC power source. The power battery 68 may be a rechargeable secondary battery such as a Nickel-Cadmium battery, a nickel hydrogen battery, or a lithium ion battery. Alternatively, the power battery 68 may be a single use primary battery such as a lithium battery or an alkaline battery. The power battery 68 is mounted in a battery housing chamber (not shown) to be electrically connected to each circuit of the camera 100.

When the AC adapter 48 is mounted to the camera 100 for an electric power supply from the AC power source to the camera 100 via the AC adapter 48, even if the power battery 68 is mounted to the battery housing chamber, the electric power output from the AC adapter 48 has the priority to be supplied to each section of the camera 100 as a driving electric power. When the AC adapter 48 is not mounted to the camera 100 and the power battery 68 is mounted to the battery housing chamber, the electric power output from the power battery 68 is supplied to each section of the camera 100 as a driving electric power.

Although not shown, the camera 100 is provided with a backup battery other than the power battery 68 which is mounted to the battery housing chamber. The built-in backup battery may be a dedicated secondary battery which is charged by the power battery 68, for example. The backup battery supplies power to the basic functions of the camera 100 when the power battery 68 is not mounted to the battery housing chamber for its replacement or removal.

That is, a stoppage of power supply from the power battery 68 or the AC adapter 48 causes a switching circuit (not shown) to connect the backup battery to a RTC 15 for a power supply to the circuits. This enables a continuous power supply to the basic functions including the RTC 15 until the end of the useful life of the backup battery 29.

The RTC (Real Time Clock) 15 is a dedicated chip for clocking, and remains in continuous operation with the electric power supply from the backup battery even while a power supply from the power battery 68 or the AC adapter 48 is stopped.

The image display LCD 102 is provided with a back light 70 which illuminates a transmissive or semi-transmissive liquid crystal panel 71 from its rear surface side, and in a power saving mode, the main CPU 20 controls the brightness (luminance) of the back light 70 via a backlight driver 72, so that the power consumption by the back light 70 can be reduced. The power saving mode can be turned on/off when the information position specifying key 126 of the operation section 120 is pressed to cause the image display LCD 102 to display a menu screen and a predetermined operation is executed on the menu screen.

Figure 4:
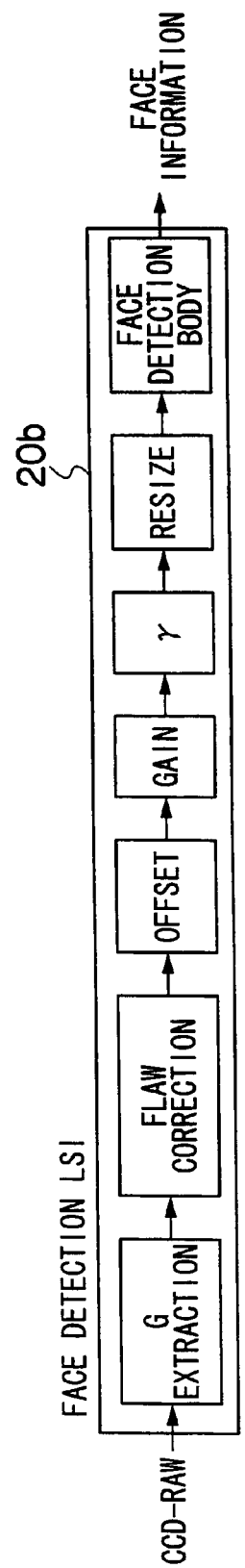
FIG. 4 shows a block diagram of a face detection LSI.

FIG. 4 shows an example of the block configuration of the face detection LSI 20*b*.

FIG. 5 illustrates the information which is output by the face detection LSI 20*b* as the face information. The face detection LSI 20*b* detects face information including the information such as the number of face regions which are a region including a face part of a human, the position of each face, the size of each face, a detection score of each face (probability that detected face region is a real face), the orientation of each face, and the tilt of each face, from a CCDRAW image which is successively output from the A/D converter section 134 and is stored in the buffer memory 135; and outputs the detection result to the buffer memory 135.

Figure 6:
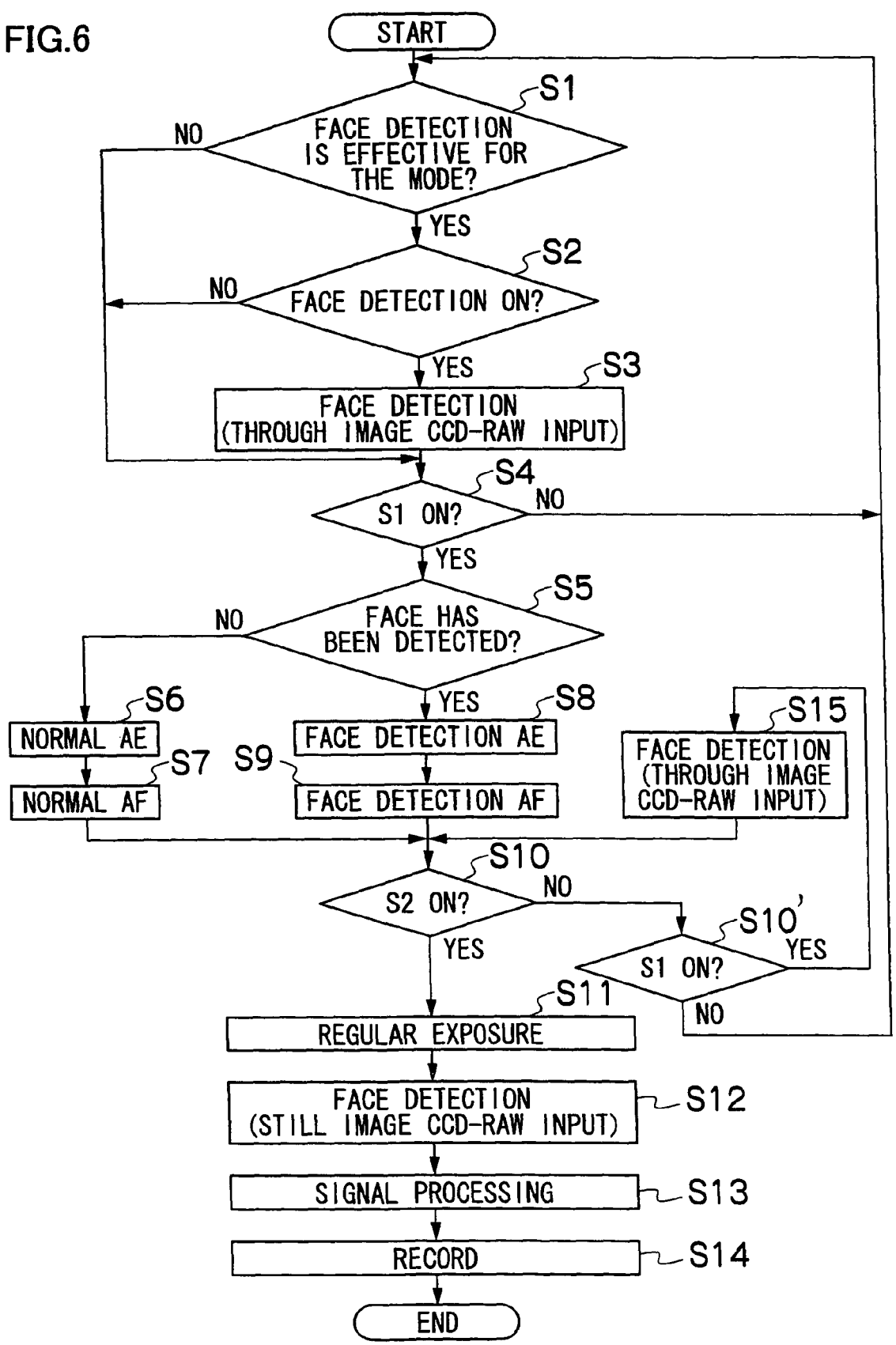
FIG. 6 shows a schematic flow chart of a photographing operation.

FIG. 6 is a flowchart to show the outline of photographing operation which utilizes a face detection processing and is controlled by the CPU 20. As shown in the figure, there are largely two different timings for performing face detection processing: that is, starting with a through image (S3) and starting after regular exposure (S12). It is an object of the face detection S1AF (S9) described herein to reliably perform focusing by limiting the AF area in the XY plane using the result of face detection in a through image.

Figure 7:
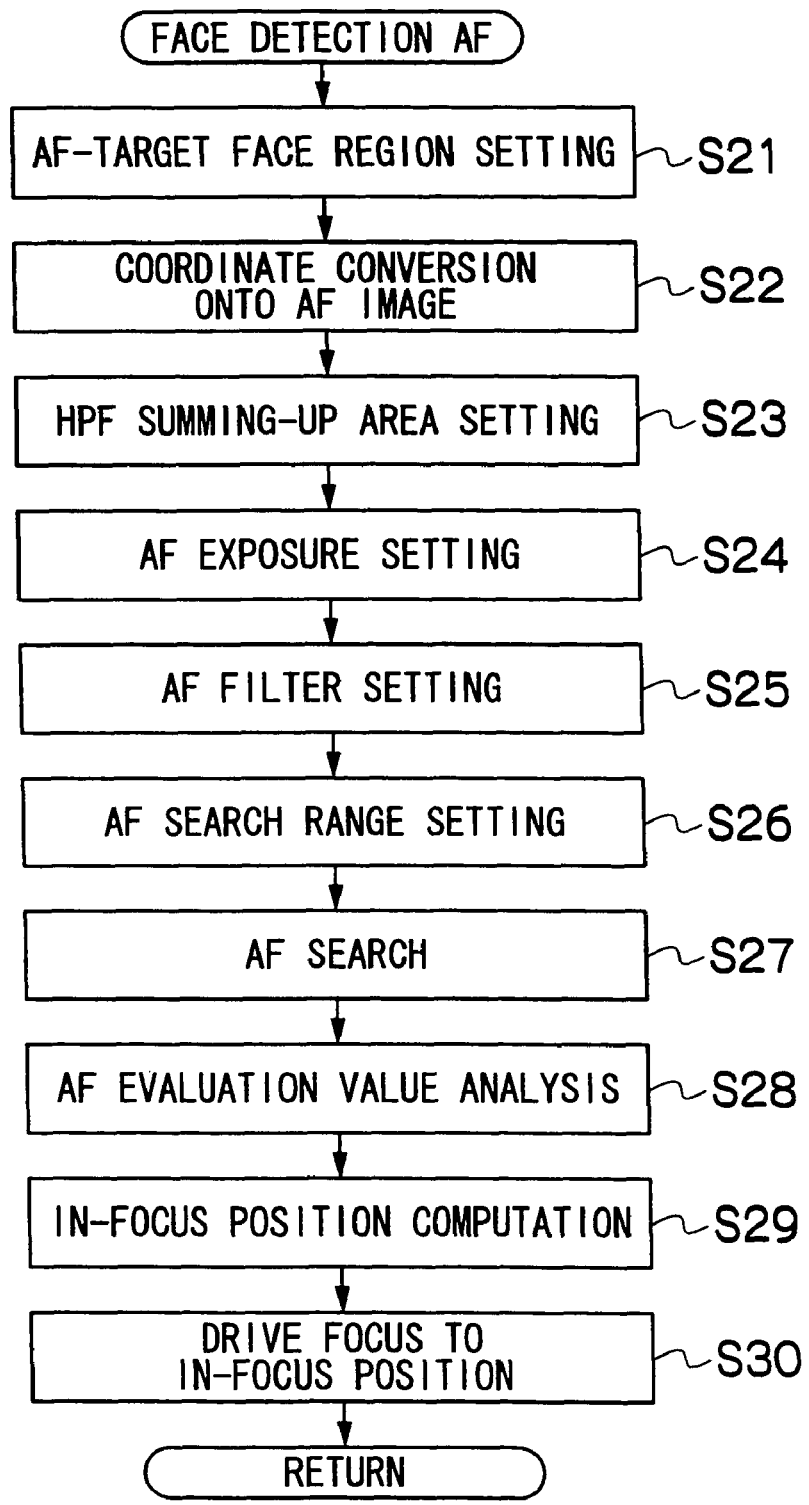
FIG. 7 shows a schematic flow chart of a face detection AF.

FIG. 7 is a flowchart to show the outline of the operation of the face detection S1AF.

Providing a brief overview of this operation, when the face detection has been turned on by a predetermined action such as pressing down the face button 125 and when a face has been detected as the result of the trial of face detection from a through image, this operation is performed in precedence to other AF schemes.

Further, as a specific method to carry out the face detection S1AF, for example, the technique described in Japanese Patent Application No. 2006-046123 by the present applicant may be applied.

Figure 8:
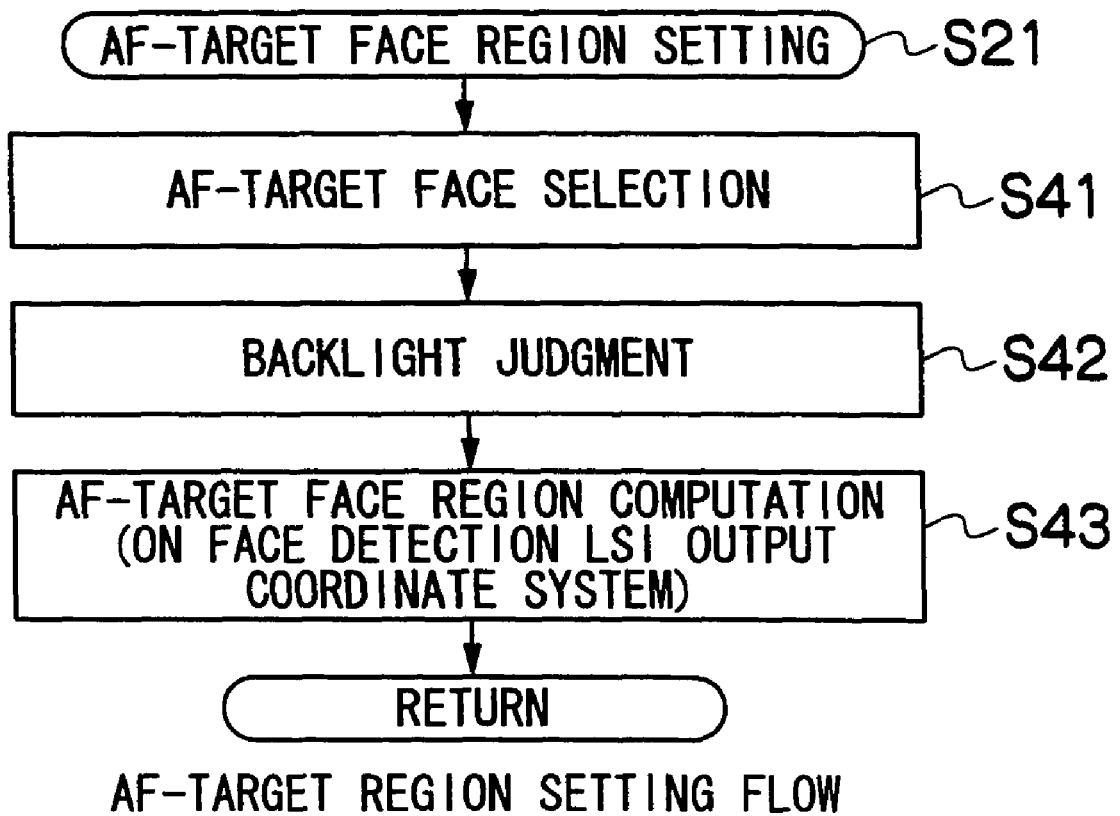
FIG. 8 shows a schematic flow chart of an AF-target face region setting.

FIG. 8 is a flowchart to show the flow in S21 [AF region setting] of the face detection S1AF.

At S41, any one face region to be the target of AF is selected. The method of selection may be for example such that the size of each face region is determined, and the face region with the largest area is selected.

At S42, a backlight judgment processing is performed, the details of which will be described below.

At S43, an AF region is calculated based on the coordinates of the face region selected at S41 out of the coordinates of the face regions output by the face detection LSI 20b. The outline of this operation is as follows; the coordinates of the center and the four corners of the rectangle of the AF region are calculated based on the size, orientation, and tilt of a face which are included in the face information detected by the face detection LSI 20b. Then the calculated center coordinates and four-corner coordinates are converted to the coordinate system of a CCDRAW image which is to be the target for actually acquiring an AF evaluation value. Then, the rectangular closed region formed by linking the four corners by a straight line after the conversion is determined to be the AF region.

Figure 9:
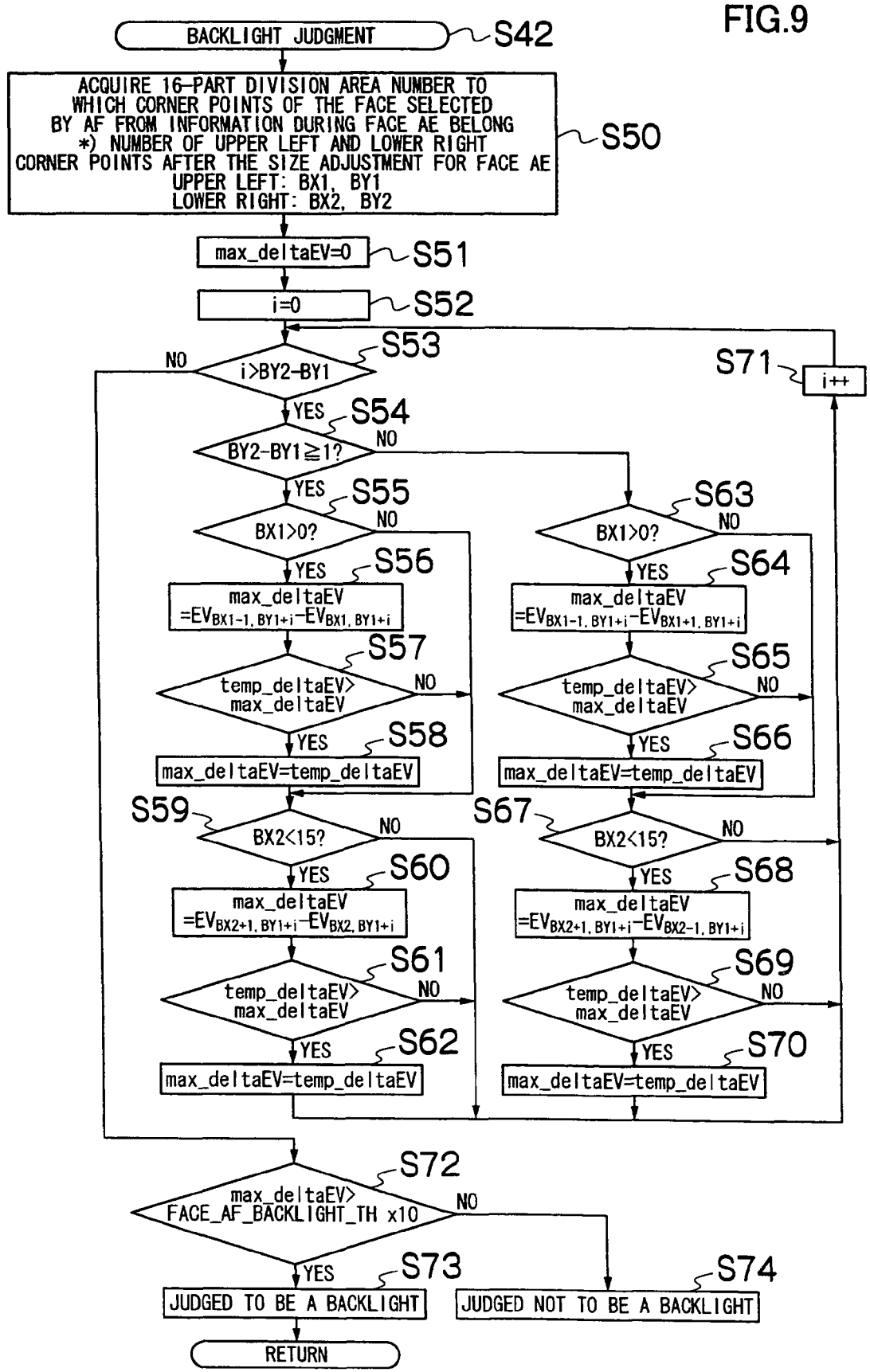
FIG. 9 shows a flowchart of a backlight judgment processing.
Figure 10:
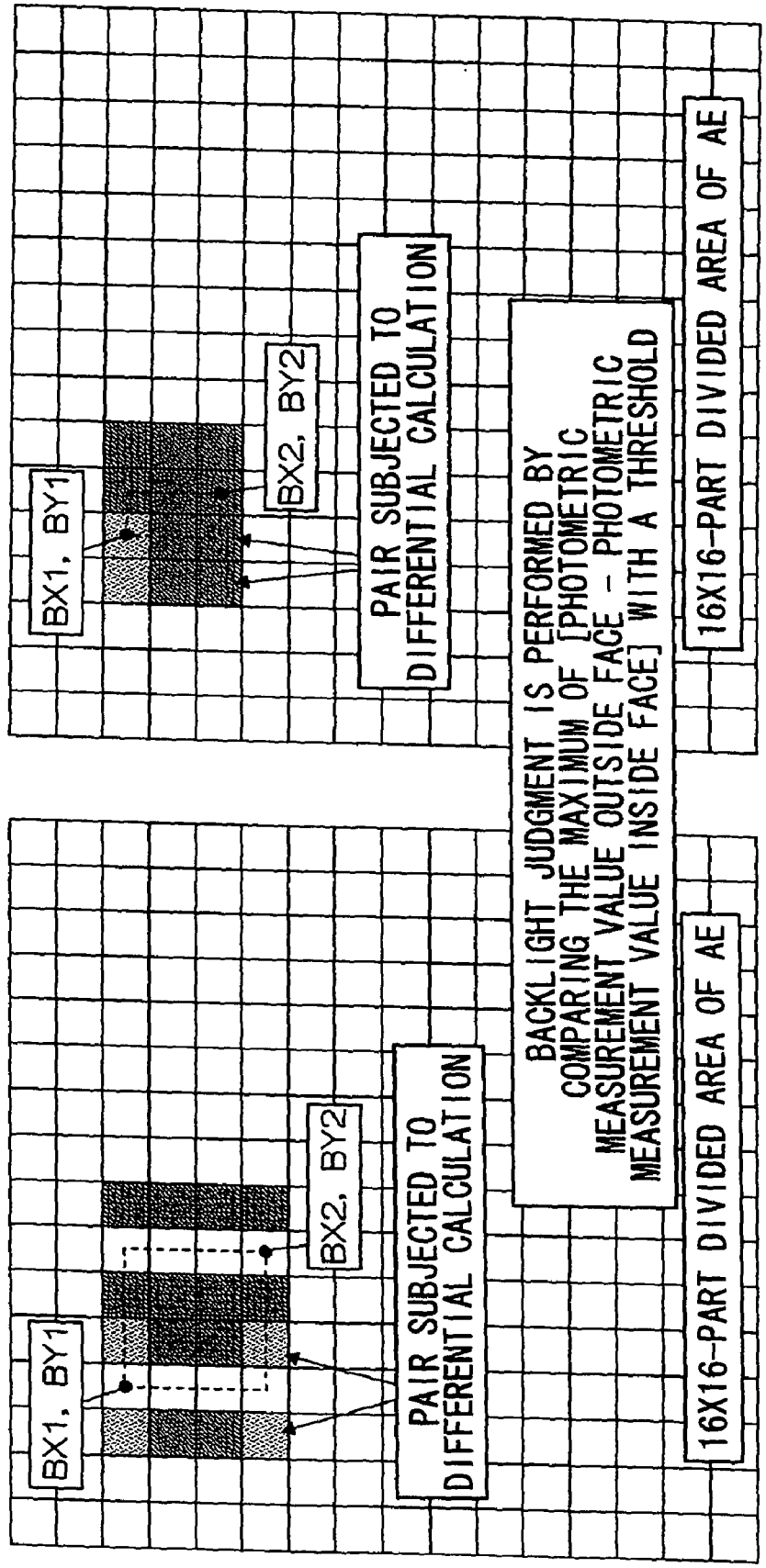
FIG. 10 shows a conceptual illustration of backlight judgment.

FIG. 9 is a flowchart to show the flow of a backlight judgment processing, and FIG. 10 conceptually illustrates main points of the backlight judgment.

In the backlight judgment processing, the photometric measurement value of a pixel outside the vertical periphery of a face region detected by the face detection LSI 20b is subtracted by the photometric measurement value of a pixel inside the vertical periphery of the face region, in opposition to the pixel outside thereof interposed by the face region periphery and, when the differential value is greater than a predetermined threshold, that value (Temp_deltaEV) is stored. This process is repeated for each pixel of 16-part divided areas of AE (see S50 to S71 in FIG. 9, and FIG. 10).

Further, the maximum value (max_deltaEV) of the above described differential values (Temp_delataEV) which are stored for each pixel is compared with a value which is 10 times of the predetermined threshold (FACE_AF_BACKLIGHT_TH)(S72) and, if max_deltaEV>FACE_AF_BACKLIGHT_TH×10, it is judged to be a backlight (S73) and if not, not to be a backlight (S74).

Moreover, depending on the configuration of the image pick-up element and the AF detection section, it may be arranged such that the photometric measurement value of a pixel outside the horizontal periphery of a face region is subtracted by the photometric measurement value of a pixel inside the horizontal periphery of the face region.

Further, as shown in FIG. 11, when judged to be a backlight by the backlight judgment processing, a flag [1] indicating that an AF operation specialized for backlight is to be performed is stored in the EEPROM 146, and when judged not to be backlight, a flag [0] indicating that the AF operation specialized for backlight is not to be performed is stored in the EEPROM 146.

FIGS. 12A and 12B are flowcharts to show the flow of the AF operation which includes a specific AF operation corresponding to a case in which the flag [1] indicating that an AF operation specialized for backlight is to be performed is stored in the EEPROM 146. This processing represents detailed contents of S26 to S30 in FIG. 7.

In this process, firstly, [backlight face AF-area setting], [interrupt-processing OFF setting], and [Full-range search OFF setting after narrow-range face search] are performed.

Here, the [backlight face AF-area setting] is a processing to set an AF region based on the face information (AF region calculated at S43 in FIG. 8) to be a backlight face AF-area.

Also, the [interrupt-processing OFF setting] is a processing in which an AF evaluation value newly obtained by performing the fine drive (step drive) of the focus lens 101b in a fixed direction by a fixed amount (Search_Step) is compared with the previous AF evaluation value obtained before the fine drive and, when the AF evaluation value has decreased, it is judged that the AF evaluation value has passed its peak position (so called a just-in-focus position) (is on a declining trend) and the processing to interrupt the AF search itself is not performed.

The reason is as follows: in an image with a large signal amount or an image of a high contrast, the presence of a peak point in an AF evaluation value is judged relatively accurately and therefore it is preferable to interrupt useless search thereafter (interrupt processing); however, a face region in a backlight condition includes a large noise component and the AF evaluation value obtained therefrom shows maximums in multiple numbers in the form like a large or small hill, and a maximum point of a first large hill which has been judged to be on a declining trend may have been caused by noise and may not be a true in-focus position. Therefore, if AF search is interrupted at the peak of the large hill, there is a risk that accurate focusing has not been completed.

Also the [Full-range search OFF setting after narrow-range face search] is a setting in which when there has been no peak of an AF evaluation value in a narrow-range search utilizing face detection, a full range search is not to be performed. That is, the range to step drive the focus lens 101b from the nearest side (Near side) toward the infinity side (INF side) is limited in a specified range (limited in a range of a predetermined distance toward the nearest side (Pulse_Target−Search_Step*Search_Range_Near) and in a range of predetermined distance toward the infinity side (Pulse_Target+Search_Step*Search_Range_Inf)) with reference to a predetermined reference position (Pulse_Target), and a peak of AF evaluation value is searched; thereafter, even when no peak is found in the AF evaluation value after the search, a full range search is not to be performed. This is because, since there is little noise component in a face region in a normal light condition, even if a peak exists in a position at a certain distance away from the predetermined reference position (Pulse_Target), a certain level of reliability is assured; however, in a backlight condition, there is a relatively greater effect from the information essentially different from natural contrast of a face such as a noise component, a peak position away from the predetermined reference point (Pusle_Target) is less reliable.

Further, the reference value for the step drive on the nearest side (Search_Range_Near) and the reference value for the step drive on the infinity side (Search_Range_Inf) may be separate values. In this case, the search range on the nearest side (Pulse Target−Search_Step*Search_Range_Near) and the search range on the infinity side (Pulse Target−Search_Step*Search_Range_Inf) may be set separately.

Then, the search range for AF of the photographing lens 101 is set (S101) with reference to the AF region calculated at S43 of FIG. 8. Moreover, the size of the search range may be set to be a different value from during normal light. Then, an AF evaluation value is acquired by driving the photographing lens 101 within the aforementioned search range (S102), and it is judged whether or not a peak is obtained in the AF evaluation value determined from the frequency component extracted by First_Filter (S103); and if a peak has been obtained, the process moves to S105 and, if a peak has not been obtained, moves to S104.

Then, it is judged whether or not a peak is obtained in the AF evaluation value determined from the frequency component extracted by Second_Filter (S104), and if a peak has been obtained, the process moves to S105 and, if not obtained, moves to S115.

And, the position of the photographing lens 101 when a peak of the AF evaluation value is obtained at S103 or in S104 is calculated and is let to be a tentative in-focus position (Temp_pint_pulse0) (S105).

Next, it is judged whether or not the tentative in-focus position (Temp_pint_pusle0) is within a range of a predetermined critical distance on the nearest side (Backlight_ Range_ Near), and whether or not within a range of a predetermined critical distance on the infinity side (Backlight_ Range_Inf), from a predetermined reference position (Pulse_Target, a focus point, so called a "preset focus," set in advance by any method,)(S106, S107), and if not within the range of the predetermined critical distance either of the nearest side or the infinity side, the tentative in-focus position (Temp_pint_pulse0) is considered to be not reliable enough as the in-focus position, and the process moves to S108. If the temporary in-focus position (Temp_ pint_pulse0) is within a predetermined range from the reference position (Pulse_Target) on the nearest side and the infinity side, the tentative in-focus position is considered to be reliable enough as the in-focus position, and the process moves to S115.

Furthermore, the method of determining the predetermined reference position (Pulse_Target) may be any method provided that it is different from the calculation method of the tentative in-focus position (Temp_pint_pulse0) and various methods are conceivable. For example, when a face region has been detected, the calculation is performed based on the proportion of the face in the screen and the zooming position. And, when no face region has been detected, the default position corresponding to the photographing mode, which is currently set, such as a landscape mode and the zooming position or the default position during normal AF may be read out form the EEPROM 146 to let this value be the predetermined reference position. Alternatively, a reference position corresponding to the result of backlight judgment may be read out from the EEPROM 146.

Further, the reference value of the critical distance on the nearest side (Backlight_Range_Near) and the reference value of the critical distance on the infinity side (Backlight_ Range_Inf) may be separate values. For example, in a long distance photographing scene such as a landscape mode, the in-focus position exists on the infinity side, and in a short distance photographing scene such as a human mode (or during face detection) or a macro photographing mode, the in-focus position exists on the nearest side; thus, the conceivable range in which the in-focus position exist will vary depending on the photographing scene, such as becoming wider or narrower, or become biased toward the nearest side or the infinity side. Then, for example, when in a human mode or during face detection, the reference value of the critical distance on the infinity side (Backlight_Range_Inf) may be smaller than the reference value of the critical distance on the nearest side (Backlight_Range_Near) so that focusing at a point in the back of the object to be imaged (so called, back focus) can be prevented.

When the reference value of the critical distance on the nearest side (Backlight_Range_Near) and the reference value of the critical distance on the infinity side (Backlight_ Range_Inf) cannot be set separately, the reference position may be changed depending on the result of discrimination of the photographing scene.

At S108, it is judged whether or not the flag [1] indicating that an AF operation specialized for a backlight condition is to be performed is stored in the EEPROM 146. If the flag [1] is stored, the process moves to S109, and if the flag [0] is stored, moves to S114.

S109 to S113 are AF operations specialized for a backlight. Here, by an AF region enlargement processing such as disclosed in and after paragraph No. 0196 in Japanese Patent Application No. 2006-046123, an AF region is enlarged toward the torso with reference to the face region, so that a region obtained by subtracting the original face region and the predetermined areas such as a neck, legs, etc. from the region obtained by enlargement (enlarged region) is let to be a chest region and, making it a new AF region independent of face region (S109), the process moves to S110. However, it is also possible to let the enlarged region itself be a new AF region.

Figure 13A:
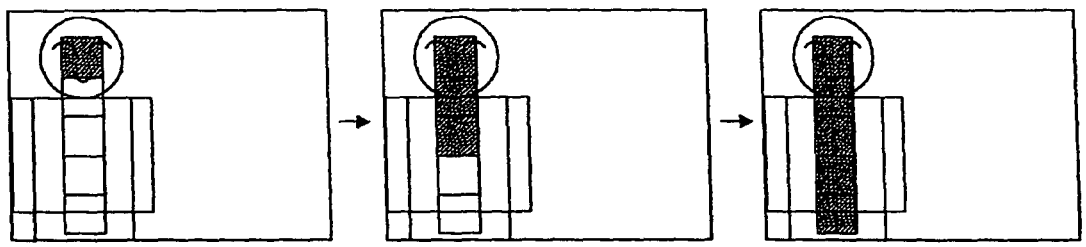
FIGS. 13A, 13B, 13C and 13D conceptually illustrate the content of an AF region enlargement processing.
Figure 13B:
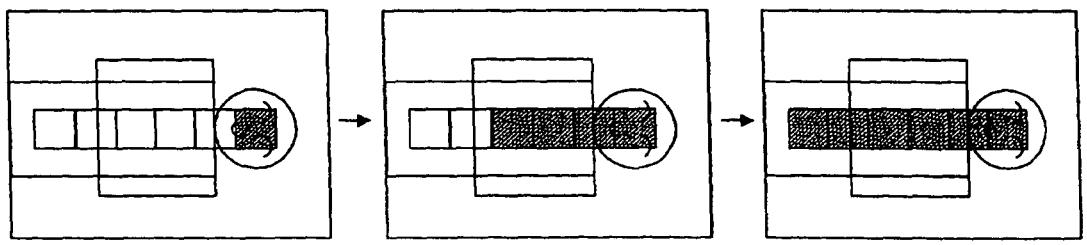
Figure 13C:
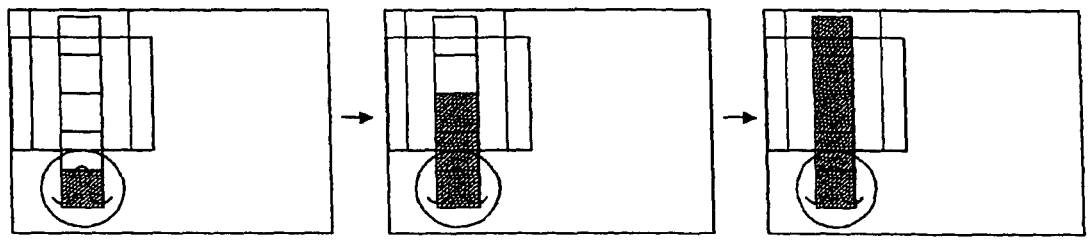
Figure 13D:
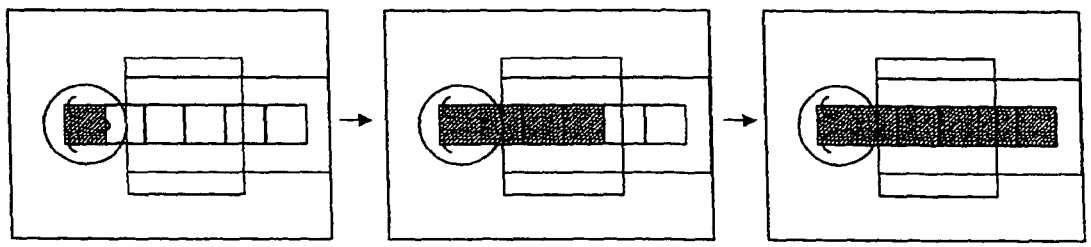

FIGS. 13A to 13D conceptually show the content of the AF region enlargement processing. This processing successively enlarges the AF region by a predetermined increment up to a predetermined size in the direction from the face toward the torso depending on the tilt of the face contained in the face information. FIG. 13A shows the manner in which, when the tilt of a face is 0 degree, the AF region is successively enlarged vertically downward by an increment of the same size as the face region up to the size of 5 times of the face region. FIG. 13B shows the manner in which, when the tilt of a face is 90 degrees, the AF region is successively enlarged horizontally leftward by an increment of the same size as the face region up to the size of 6 times of the face area. FIG. 13C shows the manner in which, when the tilt of a face is 180 degrees, the AF region is successively enlarged vertically upward by an increment of the same size as the face region up to the size of 5 times of the face area. FIG. 13D shows the manner in which, when the tilt of a face is 270 degrees, the AF region is successively enlarged horizontally rightward by an increment of the same size as the face region up to the size of 6 times of the face area.

The basics of an AF using face detection is performed by a spot AF in which an AF evaluation value is determined from an AF region determined based on the face region to search a peak point. However, in reality, there is a case in which a peak of the AF evaluation value of a face region is too small to obtain an in-focus position. In such a case, an AF region obtained by using the AF region enlargement processing is used.

At S110, with reference to the chest region in an image, a search range for the AF of the photographing lens 101 is set to obtain an AF evaluation value, and it is judged whether or not a peak of the AF evaluation value calculated from data extracted by First_Filter has been obtained; if a peak has been obtained, the process moves to S112 and, if not, moves to S111.

At S111, with reference to the chest region range in an image, a search range for the AF of the photographing lens 101 is set to obtain an AF evaluation value, and it is judged whether or not a peak of the AF evaluation value calculated from the data extracted by Second_Filter has been obtained; if a peak has been obtained, the process moves to S112 and, if not, moves to S120.

At S12, the position of the photographing lens 101 when a peak of the AF evaluation value is obtained at S110 or S111 is calculated, letting it be the tentative in-focus position (Temp_pint_pulse2).

At S113, it is judged whether or not the absolute value of the difference of two tentative in-focus positions |Temp__pint_ pusle0−Temp_pint_pulse2| is less than a predetermined allowable threshold. If the aforementioned absolute value is less than the predetermined allowable threshold, the process moves to S114 and, if not less than the predetermined allowable threshold, moves to S119.

At S14, supposing that the tentative in-focus position (Temp_pint_pulse0) is reliable as the final in-focus position, the photographing lens 101 is moved to the tentative in-focus position (Temp_pint_pulse0) to perform focusing.

S115 to S118 are processing in which each processing of S109 to S112 is respectively changed from a "face region" to a "chest region." Alternatively, it may be replaced with a "neck region", an "abdomen region", or a "leg region."

That is, first at S115, it is judged whether or not a chest region is determined such as by the above described enlargement processing. If a chest region has been determined, the process moves to S115 and, if not determined, moves to S120.

At S116, letting the chest region be the AF region, an AF evaluation value is calculated based on the data of the First_Filter to search a peak point thereof. Consequently, if a peak of the AF evaluation value exists, the process moves to S118 and, if not, moves to S117.

At S117, an AF evaluation value is obtained based on the chest region range in an image, and it is judged whether or not a peak of the AF evaluation value based on the data of Second_Filter has been obtained; and if a peak has been obtained, the process moves to S118 and, if not, moves to S120.

At S118, the position of the photographing lens 101 when a peak of the AF evaluation value is obtained is calculated to let it be the tentative in-focus position (Temp_pint_pulse0).

At S119, supposing that the tentative in-focus position (Temp_pint_pulse2) is reliable as the final in-focus position, the photographing lens 101 is moved to the tentative in-focus position (Temp_pint_pulse2) to perform focusing. However, a flag indicating whether or not the tentative in-focus position (Temp_pint_pulse2) is let to be the final in-focus position may be stored in the EEPROM 146 in advance so that the photographing lens 101 is moved to the tentative in-focus position (Temp_pint_pulse2) only when the flag indicating that the tentative in-focus position (Temp_pint_pulse2) is let to be the final in-focus position is stored.

At S120, supposing that both the tentative in-focus position (Temp_pint_pulse0) and the tentative in-focus position (Temp_pint_pulse2) are not reliable as the in-focus position, the photographing lens is moved to the predetermined reference position (Pulse_Target) to perform focusing.

By the operations described so far, even in a backlight scene, it is possible to perform the searching of the in-focus position as soon as possible by changing the AF region from a face to another region relating to a human object or by decreasing the pass frequency band of the filter.

Figure 14A:
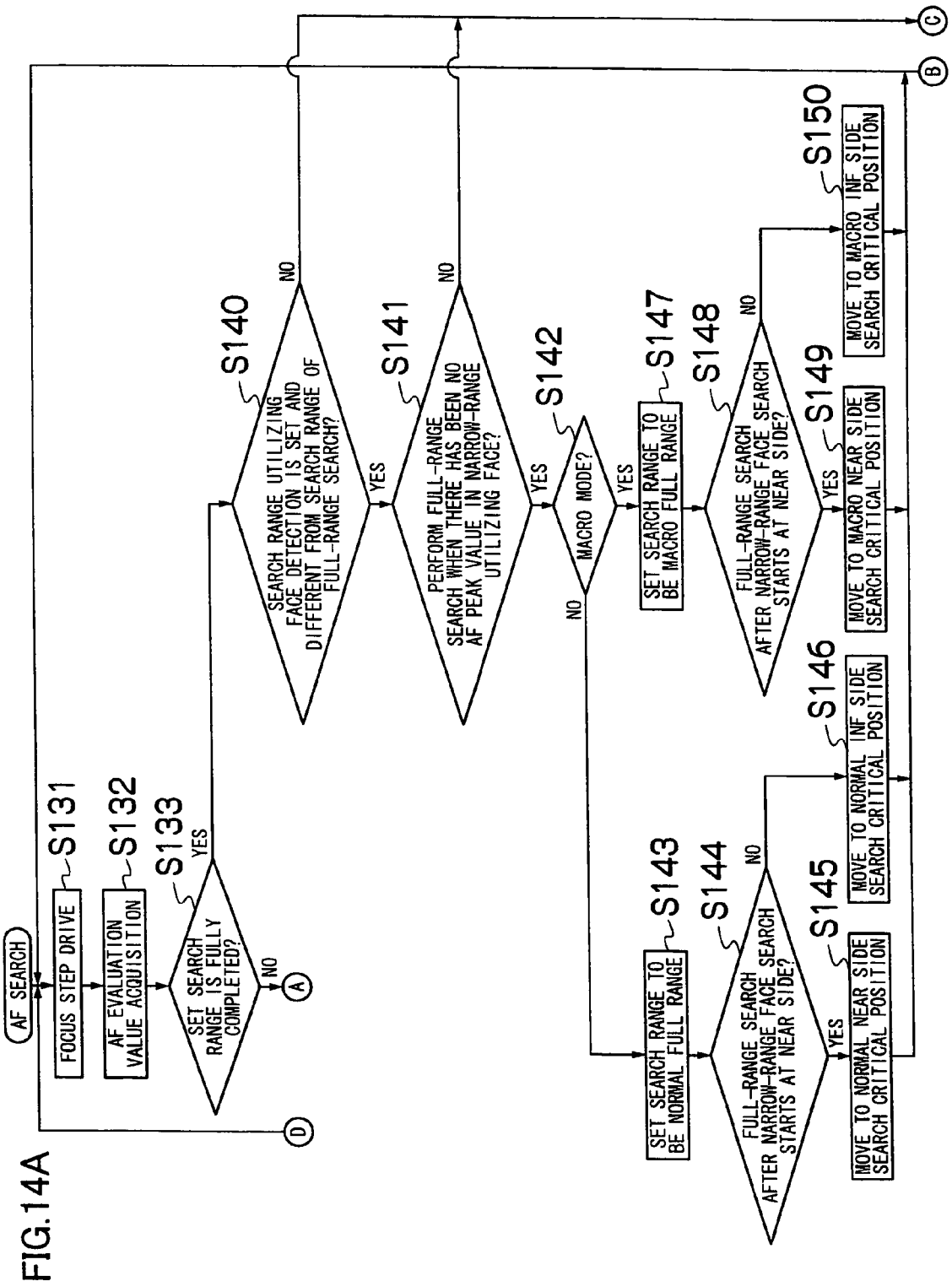
FIGS. 14A and 14B show flow charts of a normal light AF processing.
Figure 14B:
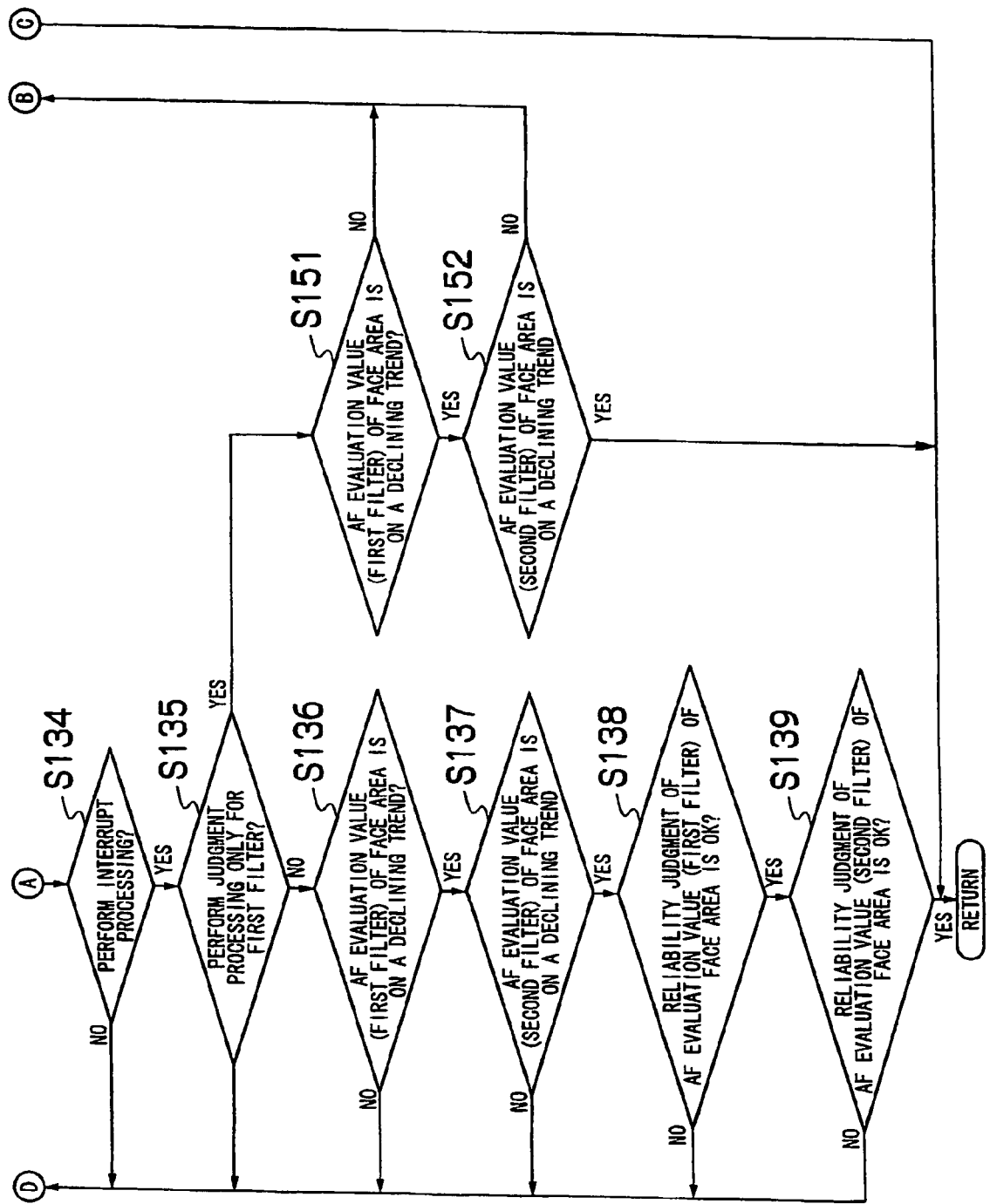

Moreover, FIGS. 14A and 14B show the flow of the AF operation including an AF operation which corresponds to a case in which a flag [0] indicating that an AF operation specialized for backlight condition is not to be performed is stored in the EEPROM 146.

Referring to the outline of this processing, an AF evaluation value is obtained by performing the fine drive (step drive) of the focus lens 101b in a fixed direction (S131 to S132). The driving quantity of the step drive, which is about the magnitude of the focus depth, is defined by the combination of the focus distance (zooming position) and the iris value during AF search. All actual driving quantities are supposed to be the same as those during normal AF, and fixed parameters set and stored in the EEPROM 146 are used.

The judgment whether or not the interrupt processing of AF search is performed (S134), and the judgment whether or not the judgment is made only on the evaluation value of First_Filter (S135) when the interruption processing is performed, are determined by the set values of the EEPROM 146.

Further, when there has not been a peak in the AF evaluation value in narrow-range search utilizing face detection, the judgment (S141) of whether or not a full range search is to be performed is also determined by the set value of EEPROM 146. When the full range search is performed, the judgment (S148) of whether the starting position of search is to be the NEAR side search limit (S149) or to be the INF side search limit (S150) may also be specified by a set value of the EEPROM 146.

Second Embodiment

At S117 of the first embodiment, the chest region is let to be the AF region and, when a peak is not obtained, the process moves to S120.

Figure 15:
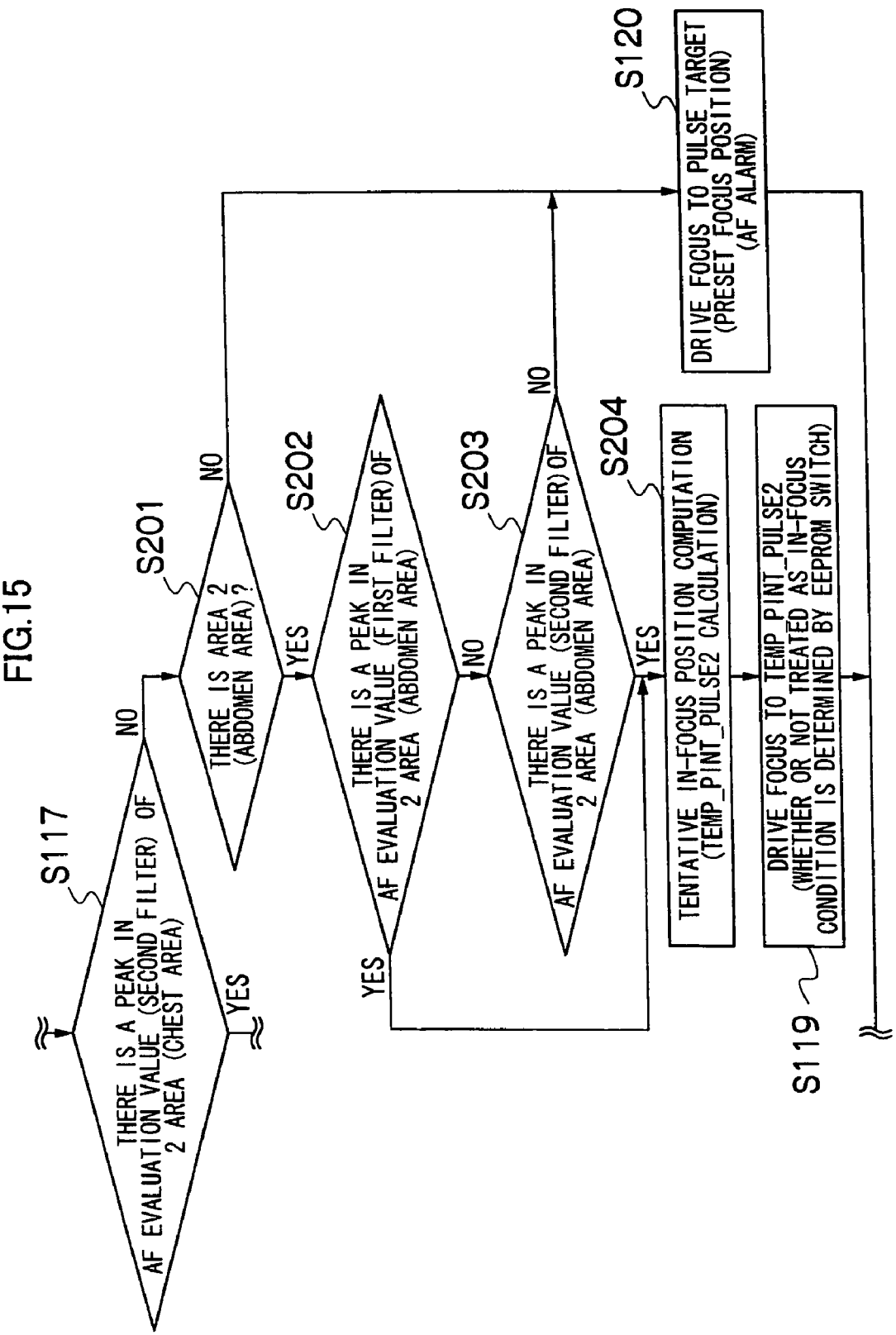
FIG. 15 shows a flow chart of an essential part of the backlight face AF processing relating to a second embodiment of the present invention.

However, as shown in FIG. 15, if no peak is obtained in the chest region ("No" at S17), the AF region may be further varied to recalculate the AF evaluation value thereby repeating the processing so as to obtain a peak. That is, an appropriate region other than the chest region such as a neck region corresponding to an abdomen (or may be a neck or legs) which is successively obtained by the above described enlargement processing is let to be the AF region (S201) and a specific frequency component is extracted from the image data of this AF region through First_Filter and Second_Filter and is summed up to obtain an AF evaluation value; and it is judged whether or not a peak has been obtained (S202, S203), and if a peak is obtained, a tentative in-focus position (Temp_pint_pulse2) is calculated (S204) thereby performing focusing on that point (S119).

In this way, by varying the AF region and thereafter repeating the operation of recalculating the AF evaluation value for two different pass frequency bands, the probability of obtaining a peak of the AF evaluation value is increased making it possible to achieve an appropriate focusing as soon as possible.

The predetermined number to repeat the change of the AF region is arbitrary. For example, when a peak of the AF evaluation value is not obtained even if the AF evaluation value is repeatedly calculated by varying the AF region 3 times from a face to a neck, an abdomen, and legs, the photographing lens 101 may be moved to the predetermined reference position (Pulse Target) to perform focusing.

Third Embodiment

Although the AF region is changed depending on the result of a backlight judgment in the first and second embodiments, it may be switched depending on the discrimination of various photographing scenes regardless of the backlight judgment.

For example, when the CPU 20 judges that a landscape mode is selected by the mode dial 123 and when a face region is detected, the AF region may be enlarged by a predetermined expansion ratio (for example 1.2 times) centered around the image.

Alternatively, in a certificate photograph mode, it is preferable not to enlarge the AF region since there is a risk of a back focus when the AF region is enlarged.

What is claimed is:

1. A photographing apparatus, in which an object image is formed on an image pickup element through a photographing lens, and a desired frequency component is extracted from an image signal obtained by an auto focus (AF) region of the image pickup element through a filter so that the extracted frequency component is integrated to calculate a focus evaluation value and, based on the calculated focus evaluation value, an in-focus position of the photographing lens is searched, the apparatus comprising:
    a scene discrimination section which discriminates a backlit photographing scene of an object image;
    a control section which restricts a searching range of the in-focus position of the photographing lens within a particular range with reference to a reference position based on the backlit photographing scene discriminated by the scene discrimination section, and thereafter moves the photographing lens to search the in-focus position;
    and wherein when no peak of the focus evaluation value is found after restricting the searching range of the in-focus position of the photographing lens within the particular range with reference to the reference position based on the backlit photographing scene discriminated by the scene discrimination section, and thereafter moving the photographing lens to search an in-focus position, the control section does not perform a full range search by which an in-focus position is searched within a full range of the movement of the photographing lens between an end of an infinity side and an end of a nearest side.

2. The photographing apparatus according to claim 1, wherein the control section changes the reference position based on the backlit photographing scene discriminated by the scene discrimination section.

3. The photographing apparatus according to claim 1, wherein
    the frequency component to be extracted by the filter may be switched from a predetermined first frequency component to a predetermined second frequency component which is lower than the first frequency component.

4. An in-focus position searching method, in which an object image is formed on an image pickup element through a photographing lens, and a desired frequency component is extracted from an image signal obtained by an auto focus (AF) region of the image pickup element through a filter so that the extracted frequency component is integrated to calculate a focus evaluation value and, based on the calculated focus evaluation value, an in-focus position of the photographing lens is searched, the method comprising the steps of:
    discriminating a backlit photographing scene of an object image;
    restricting a searching range of the in-focus position of the photographing lens within a particular range with reference to a reference position based on the backlit photographing scene discriminated by the scene discrimination section, and thereafter moving the photographing lens to search the in-focus position;
    and wherein when no peak of the focus evaluation value is found after restricting the searching range of the in-focus position of the photographing lens within the particular range with reference to the reference position based on the backlit photographing scene discriminated by the scene discrimination section, and thereafter moving the photographing lens to search an in-focus position, the control section does not perform a full range search by which an in-focus position is searched within a full range of the movement of the photographing lens between an end of an infinity side and an end of a nearest side.

5. The photographing apparatus according to claim 1, further comprising a face detecting section, and wherein when the face detecting section detects a face in the image signal, the reference position comprises at least one of a first reference position at a near side focus and a second reference position at an infinity side focus.

6. The photographing apparatus according to claim 1, further comprising a face detection section, and wherein when the face detection section detects a face in the image signal, one reference position is set based on a proportion of the detected face in the image signal and a zoom position.

7. The photographing apparatus according to claim 1, wherein the reference position is determined based on a detected backlight condition.

8. The photographing apparatus according to claim 1, wherein the reference position is determined based on a photographing mode set.

* * * * *